United States Patent [19]

Puzio

[11] Patent Number: 4,969,486

[45] Date of Patent: Nov. 13, 1990

[54] FLOW CONTROL APPARATUS

[76] Inventor: Eugene T. Puzio, 199 Park Ave., Trenton, N.J. 08690

[21] Appl. No.: 422,384

[22] Filed: Oct. 16, 1989

Related U.S. Application Data

[63] Continuation of Ser. No. 328,372, Mar. 24, 1989, abandoned.

[51] Int. Cl.$^5$ ............................................. F16K 11/10
[52] U.S. Cl. .................................. 137/624.18; 251/7; 137/597
[58] Field of Search ....................... 137/624.11, 624.18, 137/624.2, 597; 251/6, 7, 8, 9

[56] References Cited

U.S. PATENT DOCUMENTS

| | | | |
|---|---|---|---|
| 2,167,952 | 8/1939 | Jordan | 251/7 |
| 2,412,397 | 12/1940 | Harper | 251/7 X |
| 2,645,245 | 7/1953 | Maisch | 251/7 X |
| 2,660,395 | 11/1953 | Mair | 251/7 X |
| 3,011,750 | 12/1961 | Johnson | 251/7 X |
| 3,245,269 | 4/1966 | Ivie | 251/7 X |
| 3,372,708 | 3/1968 | Hotchkin | 137/624.2 |
| 3,759,483 | 9/1973 | Baxter | 251/7 X |
| 3,893,600 | 7/1975 | Shields | 251/7 X |
| 4,081,170 | 3/1978 | Doss | 251/7 X |
| 4,180,099 | 12/1979 | Moore | 137/625.2 |
| 4,239,464 | 12/1980 | Hein | 251/7 X |
| 4,436,277 | 3/1984 | Robak | 251/6 |
| 4,439,179 | 3/1984 | Lueders | 251/7 X |
| 4,484,599 | 1/1984 | Hanover | 251/6 X |
| 4,576,593 | 3/1986 | Mommer | 251/7 X |
| 4,585,442 | 4/1986 | Mannes | 251/7 X |
| 4,616,802 | 10/1986 | Tseng | 251/7 |
| 4,688,753 | 8/1987 | Tseng | 251/7 |
| 4,786,028 | 11/1988 | Hammond | 251/7 |

*Primary Examiner*—Alan Cohan
*Attorney, Agent, or Firm*—Sperry, Zoda & Kane

[57] ABSTRACT

A flow control apparatus for regulating fluid flow through a plurality of tubular conduits which includes a housing and a pivotable control wheel capable of pivotal movement about the central axis thereof through a plurality of discrete positions defined peripherally therearound. The control wheel includes a cam profile edge circumferentially therearound adapted to abut a rocker member. The rocker member is movable between an initial flow position allowing flow through one tubular conduit while preventing flow through another and a final flow position preventing flow through the former tubular conduit and allowing flow through the latter tubular conduit. The rocker includes a first arm carrying a cam follower adapted to follow the cam profile edge to hold the rocker in the initial flow position and being responsive to movement into the cam slot means of the cam profile edge to facilitate movement of the rocker to the final flow position. First and second plungers are defined wherein the first plunger is moved toward the tubular conduits in the closed position responsive to the rocker being in the initial flow position and wherein the second plunger is movable toward the tubular conduits whenever the rocker is located in the final flow position.

18 Claims, 2 Drawing Sheets

FLOW CONTROL APPARATUS

This application is a continuation of U.S. Ser. No. 07/328,372 filed Mar. 24, 1989, which is now abandoned.

BACKGROUND OF THE INVENTION

1. Field Of The Invention

The present invention deals with the field of devices particularly usable for controlling fluid flow through flexible walled tubular conduits. Such valving systems are utilized in a variety of different fields of art but are particularly usable with respect to dialysis equipment. The present invention is usable with such dialysis equipment wherein a plurality of bags, normally 5 or 6 bags of liquid, are fed into a patient over an extended period of time of perhaps 15 to 20 minutes per bag. Each of these initial bags supplying fluid for traveling through one of the tubular conduits is of identical composition. On the other hand the final bag is of a distinctly different composition and it is important that the timing between the initial 5 to 6 bags and the final bag is carefully controlled. The apparatus of the present apparatus provides a fluid flow control valving system specifically capable for usage in this regard but also being generally usable with respect to any type of fluid flow through tubular conduits.

2. Background Of The Invention

Restriction of fluid flow through tubular conduits has normally been achieved by crimping or narrowing of the tubular cross section by collapsing the external wall thereof. This collapsing can be to a complete extent to prevent any fluid flow therethrough or can be to a partial extent to merely restrict flow. The present invention is particularly usable for completely preventing flow alternatively through a first and second tubular flow conduit. Examples of prior art devices for such restrictions are shown in U.S. Pat. No. 2,167,952 patented Aug. 1, 1939 to L. Jordan on a Valve; U.S. Pat. No. 2,412,397 patented Dec. 10, 1946 to L. Harper on a Flexible Tube Pump; U.S. Pat. No. 2,660,395 patented Nov. 24, 1953 to J. Mair et al on a Compressible Tube Valve; U.S. Pat. No. 3,011,750 patented Dec. 5, 1061 to C. Johnson et al on a Pipe Squeezing Apparatus; U.S. Pat. No. 3,550,619 patented Dec. 29, 1970 to P. Halasz on a Tubing Holder; U.S. Pat. No. 3,759,483 patented Sept. 18, 1973 to T. Baxter on a Fluid Actuated Control Valve; U.S. Pat. No. 4,081,170 patented Mar. 28, 1978 to D. Doss, Jr. on a Clamp For Tubular Bodies; U.S. Pat. No. 4,239,464 patented Dec. 16, 1980 to L. Hein on a Blood Pump; U.S. Pat. No. 4,436,277 patented Mar. 13, 1984 to E. Robak et al on a Torque Pinch Valve; U.S. Pat. No. 4,439,179 patented Mar. 27, 1984 to A. Lueders et al on a Dual Tubing Clamp; U.S. Pat. No. 4,484,599 patented Nov. 27, 1984 to B. Hanover et al on a Pinch-Type Pressure-Or-Flow-Regulating Valve; U.S. Pat. No. 4,576,593 patented Mar. 18, 1986 to H. Mommer on a Dosing Device For Infusion Or Transfusion Of Fluids; U.S. Pat. No. 4,585,442 patented Apr. 29, 1986 to A. Mannes on a Miniature Intravenous Infusion Rate Controller; U.S. Pat. No. 4,616,802 patented Oct. 14, 1986 to C. Tseng et al on a Tubing Occluder; U.S. Pat. No. 4,688,753 patented Aug. 25, 1987 to Charles Tseng et al on a Tubing Occluder; and U.S. Pat. No. 4,786,028 patented Nov. 22, 1988 to B. Hammond on a Fluid Flow Control Valve.

SUMMARY OF THE INVENTION

The present invention provides a fluid control apparatus for regulating fluid flow through a plurality of compressible tubular conduits and is particularly usable with kidney dialysis equipment. The apparatus of the present invention includes a housing and may include a control wheel oriented horizontally and being pivotable about a central axis extending vertically therethrough. The control wheel is mounted with freedom of pivotal movement with respect to the housing and defines a plurality of discrete positions peripherally therealong such as a plurality of first bag positions and a last bag position. Movement of the control wheel between different positions is made possible by a knob which can be centrally located in the upper surface thereof or by any other conventional structure for controlling positioning thereof such as electronic initiation means. Movement of the control wheel is also achieved and controlled by a drive means which is operatively attached thereto which is adapted to automatically drive the control wheel through all of the first bag positions and to the last bag position after the control wheel has been initially placed. This initial placement can be achieved by the knob or can be achieved by an electronic means controlling the drive means. Regardless of the initialization procedure the drive means is adapted to control movement of the control wheel through the plurality of automatic position changes.

The control wheel includes a cam profile edge extending circumferentially therearound. It also defines a cam slot at one location in the cam profile edge. A wheel lug is rotatably secured with respect to the control wheel and includes a wheel lug roller to facilitate abutting contact thereof.

A rocker member is pivotally movable with respect to the housing and is positioned adjacent the control wheel. The rocker is movable between an initial flow position and a follow flow position. The rocker includes a first arm extending outwardly toward the control wheel with a cam follower member secured thereon. The cam follower member is adapted to abut the cam profile edge of the control wheel and the cam slot to selectively position pivotal movement of the rocker member in response to the rotational position of the control wheel. The cam follower preferably includes a cam follower roller to facilitate smooth abutment between the cam profile edge, cam slot and the control wheel. The rocker is responsive to the cam follower being in abutment with respect to the cam profile edge of the control wheel to urge the rocker to the initial flow position. The rocker is further responsive to the cam follower roller being in abutment with respect to the cam slot means of the control wheel to facilitate movement of the rocker to the final flow position.

The rocker also includes a second arm extending outwardly toward the control wheel and including a lug abutment surface adapted to selectively abut the wheel lug responsive to pivotal movement of the control wheel to urge the rocker means to the final flow position. A first driving surface is defined on the rocker member and is selectively movable toward one of the tubular conduits responsive to movement of the rocker to the initial flow position to facilitate tubular conduit restriction responsive to abutment of the cam follower of the first arm with respect to the cam profile edge of the control wheel. A second driving surface is movable toward at least one other tubular conduit responsive to movement of the rocker to the final flow position to facilitate tubular conduit restriction responsive to abutment of the cam follower and the first arm with respect to the cam slot of the control wheel and abutment of the lug abutment means with respect to the wheel lug.

A first plunger retracting surface is included on the rocker means and is adapted to contact a first plunger to facilitate return thereof to the steady state retracted position which is not in abutment with the tubular flow conduit thereadjacent.

A first plunger is movably mounted on the housing for selective movement thereof between a steady state first open position and a first closed position with respect to a tubular conduit. The first plunger is positioned adjacent the first plunger retracting surface of the rocker member to be selectively placed in abutment therewith to urge movement of the first plunger means to the first open position responsive to movement of the rocker means to the final flow position.

The first plunger means includes a first drive head positioned adjacent the rocker member. The first drive head includes a first drive head roller to facilitate abutting contact between the first drive head and the first driving surface of the rocker member. The first driving surface of the rocker member is adjacent to the first drive head roller to be selectively placed in abutment therewith for urging the first plunger to the first closed position responsive to movement of the rocker means to the initial flow position. Also the first plunger retracting surface is adapted to abut the first drive head of the first plunger means responsive to movement of the rocker means to the final flow position to facilitate movement of the first plunger to the first opened position. A first restriction means is also included on the first plunger positioned adjacent selected tubular conduits to allow free fluid flow therethrough responsive to the first plunger being in the first opened position and to restrict fluid flow therethrough responsive to the first plunger means being in the first closed position.

A first guide means is included on the first plunger for maintaining orientation thereof with respect to the housing, the rocker member and the tubular conduits. The first guide means may specifically be configured as a first groove and stud construction defined between the first plunger and the first housing to maintain orientation of the first plunger with respect to the rocker and tubular conduit. A first return spring means may be included attached to the housing for facilitating maintaining of the first plunger resiliently biased into the first opened position under steady state conditions.

A second plunger means may be included movably mounted on the housing for selective movement thereof between a steady state second opened position and a second closed position with respect to another tubular conduit. The second plunger means may further include a second drive head positioned adjacent the rocker member. Also the second drive head includes a second drive head roller facilitating abutting contact between the second drive head and the second driving surface of the rocker. The second driving surface of the rocker is adjacent to the second drive head roller to be selectively placed in abutment therewith for urging the second plunger means to the closed position responsive to movement of the rocker to the final flow position.

A second restriction means may be positioned on the second plunger adjacent selected tubular conduits to allow free fluid flow therethrough responsive to the second plunger means being in the second opened position and to restrict fluid flow therethrough responsive to the second plunger means being in the second closed position. A second guide construction may be included in the form of a second groove and stud configuration defined between the second plunger and the housing means to maintain orientation of the second plunger with respect to the housing, the rocker and the compressible tubular conduits. A second return spring may also be included attached to the housing for maintaining the second plunger resiliently biased into a second opened position under steady state conditions.

It is an object of the present invention to provide a fluid flow control apparatus for regulating fluid flow through at least two compressible tubular conduits wherein close and accurate control of flow of dialysis fluids through tubular conduits can be achieved.

It is an object of the present invention to provide a fluid flow control apparatus for regulating fluid flow through at least two compressible tubular conduits wherein control of slow release of fluids through tubular conduits over extended periods of time can be closely monitored.

It is an object of the present invention to provide a fluid flow control apparatus for regulating fluid flow through at least two compressible tubular conduits wherein accurate positive engagement between mechanical members assures high efficiency of operation.

It is an object of the present invention to provide a fluid flow control apparatus for regulating fluid flow through at least two compressible tubular conduits wherein initial cost of capital outlay for equipment is minimized.

It is an object of the present invention to provide a fluid flow control apparatus for regulating fluid flow through at least two compressible tubular conduits wherein maintenance requirements are minimized.

It is an object of the present invention to provide a fluid flow control apparatus for regulating fluid flow through at least two compressible tubular conduits wherein system down time is severely restricted.

It is an object of the present invention to provide a fluid flow control apparatus for regulating fluid flow through at least two compressible tubular conduits wherein slow release of dialysis fluids from a plurality of initial bags can be carefully controlled followed immediately and automatically by slow release of fluids from a final bag.

It is an object of the present invention to provide a fluid flow control apparatus for regulating fluid flow through at least two compressible tubular conduits wherein accurate alignment of restricting crimping edges with respect to vertically extending tubular conduits is controlled by guide means thereon.

It is an object of the present invention to provide a fluid flow control apparatus for regulating fluid flow through at least two compressible tubular conduits wherein complete operation of the system is initiated by rotation of the control wheel to the desired position for controlling the release of a pre-determined number of initial bags which will thereafter be followed by release of fluids from a final bag.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
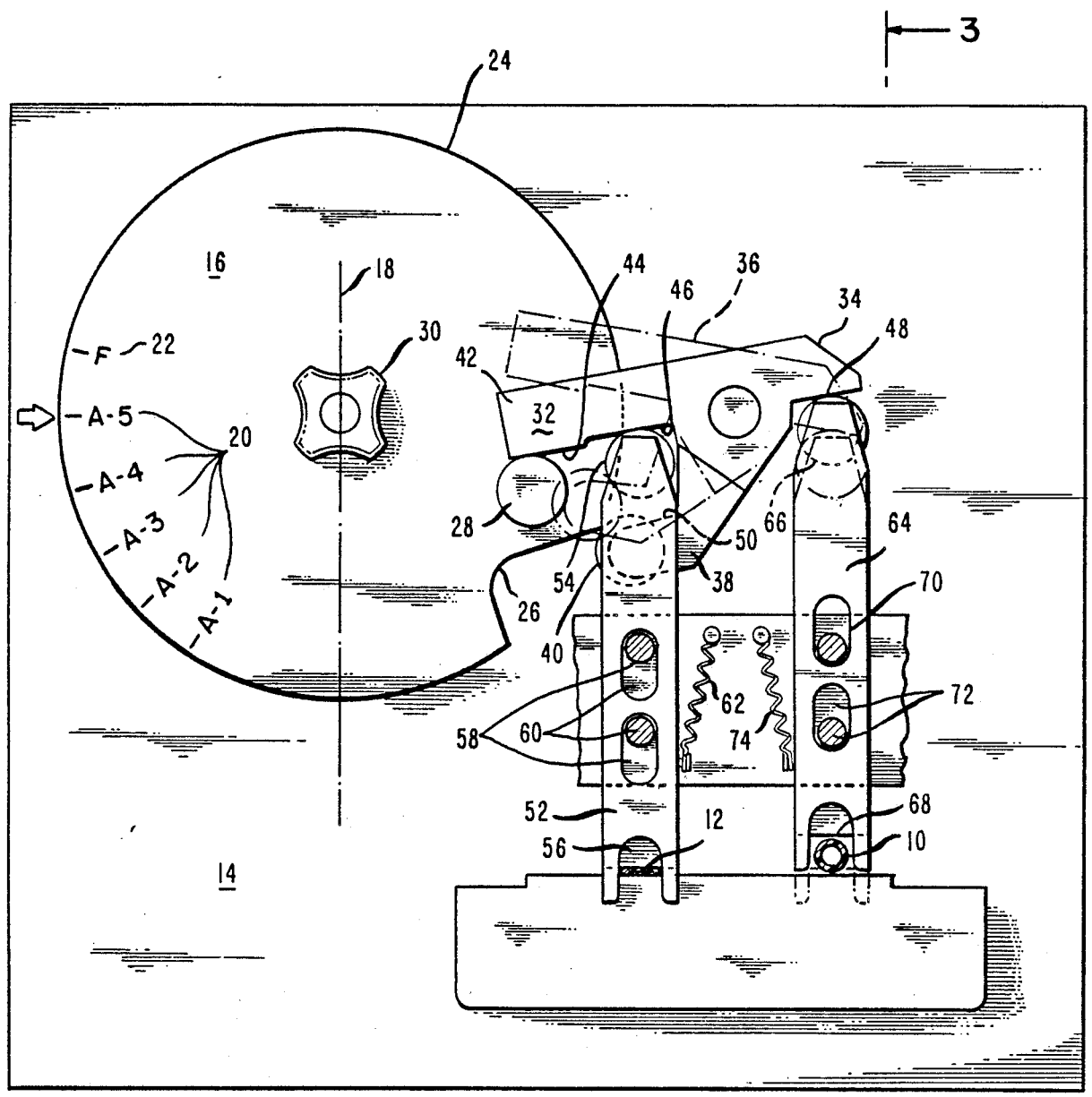
FIG. 1 is a top plan view of an embodiment of the flow control apparatus of the present invention.
Figure 2:
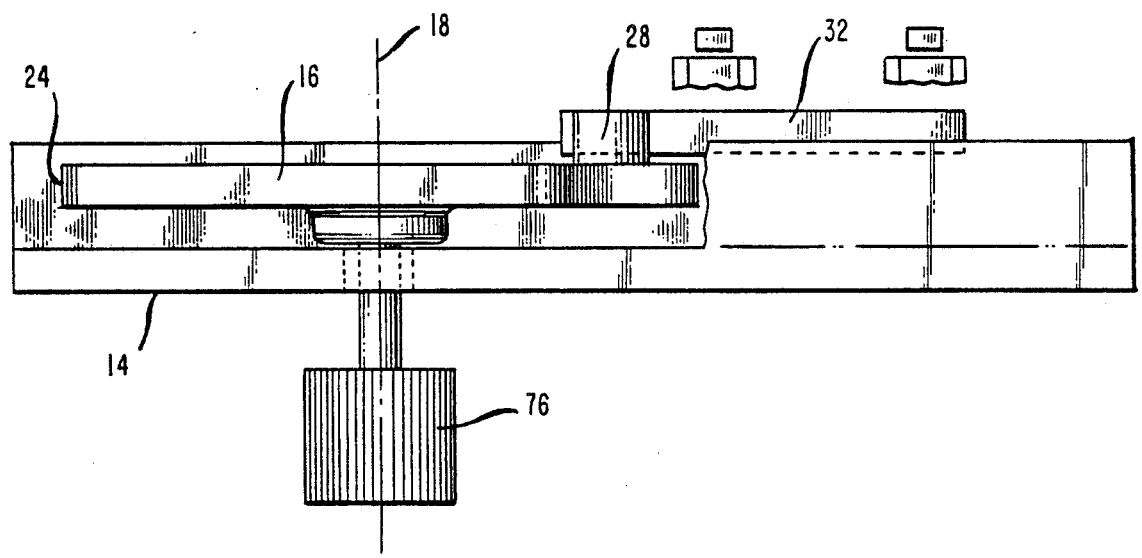
FIG. 2 is a front plan view of an embodiment shown in FIG. 1.
Figure 3:
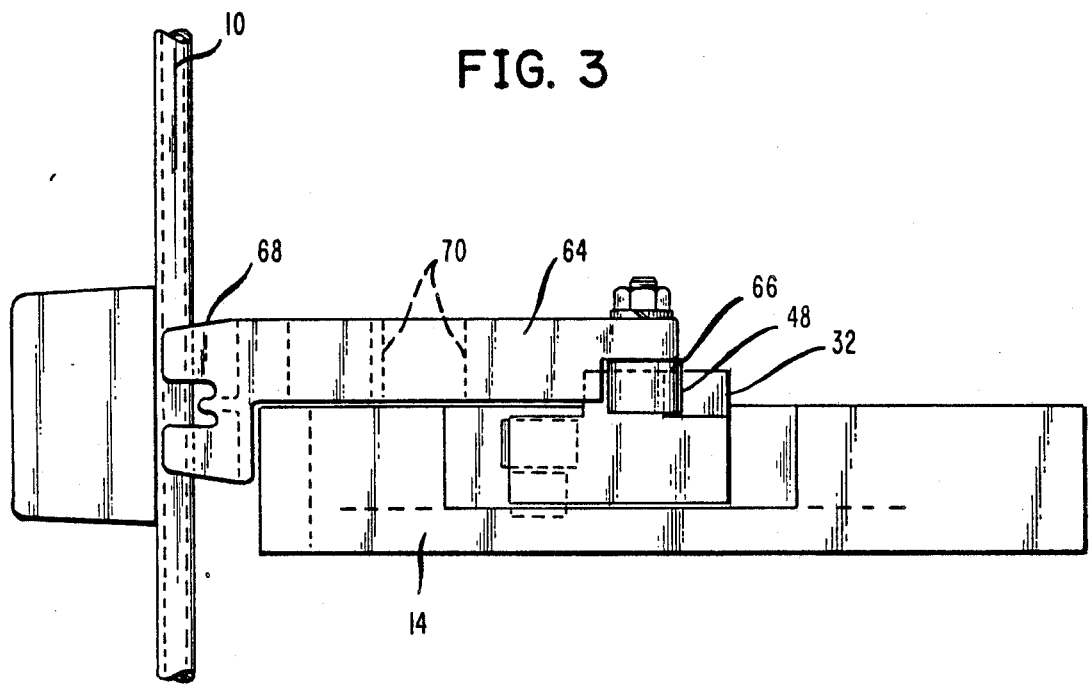
FIG. 3 is a side plan view of the embodiment shown in FIG. 1 along lines 3—3.

The present invention discloses a flow control apparatus particularly usable for regulating fluid flow through at least two compressible tubular conduits 10 and 11. The apparatus includes a housing means 14 with a control wheel 16 mounted therein with freedom of pivotal rotational movement about a central axis 18 extending generally vertically therethrough.

The control wheel 16 is movable through a plurality of discrete first bag positions 20 and includes in this preferred embodiment a single last bag position 22. A cam profile edge 24 extends peripherally about the outermost circumferential surface of the control wheel 16 and defines a cam slot 26 at one location therearound. A wheel lug roller 28 is mounted to the surface of the control wheel. A knob means 30 may also be secured to the upper surface of the control wheel to facilitate initial placement thereof at the desired initial position chosen from positions 20 and 22.

A rocker means 32 is pivotally mounted with respect to housing 14 and is adapted to be movable between an initial flow position 34 shown in FIG. 1 and a final flow position 36 shown in phantom outline on FIG. 1. Rocker means 32 includes a first arm means 38 having a cam follower roller 40 pivotally mounted thereon. Cam follower roller 40 is adapted to be in abutment with respect to the cam profile edge 24 and/or the cam slot means 26 as the control wheel 16 is urged to rotate by the drive means 76.

A second arm means 42 extends outwardly from the rocker means and is adapted to selectively be abutted along the lug abutment area 44 by the wheel lug roller 28 of control wheel 16. With this configuration the rocker means 32 is positioned in the initial flow position 34 responsive to the cam follower roller 40 being in abutment with respect to the cam profile edge 24 of control wheel 16. As the control wheel 16 rotates the cam follower roller 40 will eventually come in contact with the cam slot means 26 to facilitate urging of the rocker means 32 to the final flow position shown in outline on FIG. 1. Movement of the rocker to the final flow position will be made possible by movement of the cam follower roller 40 into cam slot means 26, but positive movement will be achieved by abutment of the wheel lug roller 28 with respect to the lug abutment surface 44 defined on second arm means 42 of rocker means 32. This contact will cause rotation of the rocker means as shown in FIG. 1 in the clockwise direction to the final flow position 36.

Rocker means 32 includes a first driving surface 46 and a second driving surface 48 facing the tubular conduits 10 and 12. A first plunger means 52 is movably mounted with respect to the housing 14 adjacent the first driving surface 46. In a similar fashion a second plunger means 64 is movably mounted with respect to housing 14 adjacent the second driving surface 48. First plunger means 52 is biased into the steady state retracted position by a first return spring means 62. In a similar fashion second plunger means 64 is biased into a steady state retracted position by a second return spring means 74. Thus in the steady state position both the first and second plunger means 52 and 64 respectively are biased away from the tubular conduits 10 and 12.

First plunger means 52 includes a first drive roller 54 adapted to be in abutment with respect to the first driving surface 46. First plunger means 52 also includes a first restriction means 56 positioned adjacent said tubular flow conduit 12 to selectively cause restriction of flow therethrough. Movement of the rocker means 32 to the initial flow position 34 causes abutting engagement of the first driving surface 46 with respect to the first drive roller 54 of first plunger means 52 causing movement of the first restriction means 64 against the restraint of the first return spring means 62 into engagement with respect to the tubular conduit 12 for cessation of fluid flow therethrough.

In a similar fashion movement of the rocker means 32 to the final flow position 36 will cause abutting engagement of the second driving surface 48 with respect to a second drive head 66 defined on second plunger means 64. Movement of second driving surface 48 against second drive head 66 will cause the second restriction means 68 also defined on the second plunger means 64 to move in abutment with respect to the tubular conduit 10 to cease fluid flow therethrough. In each position of the rocker means 32 fluid flow through one of the tubular conduits will be allowed simultaneously with cessation of fluid flow through the opposite tubular conduit. In this manner control of fluid flow from a plurality of initial bags and one or more final bags can be carefully and accurately achieved during dialysis. Movement of the rocker means from the initial flow position 34 to the final flow position 36 is further positively achieved by a first plunger retracting surface 50 defined on the rocker 32 which is adapted to urge the first plunger means 52 to the retracted or opened position responsive to movement of the rocker 32 to the final flow position. First plunger retracting surface 50 is adapted to engage the first drive head roller 54 and pull the first plunger means 52 away from the tubular conduit 12.

Control of orientation of the first plunger means 52 with respect to the housing, the rocker member and the tubular conduit is achieved by a first guide means 58. This guide means may take the form of a first groove and stud configuration 60. In a similar fashion control of orientation of the second plunger means 64 with respect to the rocker member, tubular conduits and housing is achieved by a second guide means 70 which may take the form of a second groove and stud configuration 72.

In operation the present invention is initially set by a mechanical means such as the knob means 30 or by other electronic control means of the drive means 76 to an initial position. When used with dialysis equipment the present invention is designed to allow for usage of a plurality of initial bags of fluid flowing through the tubular conduit 10 followed normally by a single final bag of solution which is adapted to flow through tubular conduit 12. In this manner of operation the control wheel will be initially set to one of a plurality of initial positions to allow for complete flow of fluid flow and exit of all fluids from the number of initial bags, normally 5 or 6 initial bags. When the control wheel is moved automatically to the final bag position the flow control apparatus of the present invention will close the tubular conduit 10 which extends to the initial bags and open the tubular conduit 12 which extends to the final bag.

Positioning of the control wheel at one of the initial positions will place the rocker member in the initial flow position. In this position the first plunger means 52 will be held in the closed position whereas the second plunger means 64 will be held in the opened position. Upon movement of the control wheel to the final flow position the cam follower roller 40 will be allowed to move into cam slot means 26 and the wheel lug roller 28 will contact the lug abutment means 44 to urge the rocker to the final flow position. The first plunger means 52 will then be allowed to return to the opened position by operation of the first return spring 62 thereon and by operation of the first plunger retracting surface 50 against the first drive roller 54. Simultaneously the second driving surface 48 will be caused to move downwardly as shown in FIG. 1 against second drive head roller 66 urging movement of the second plunger means 64 to the closed position with the second restriction means 68 thereof in abutting engagement with respect to the tubular conduit 10 to prevent fluid flow therethrough.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A flow control apparatus for regulating fluid flow through at least two compressible tubular conduits which comprises:
   (a) a housing means;
   (b) a control wheel defining a central axis extending therethrough, said control wheel being mounted with freedom of pivotal movement with respect to said housing means about said central axis thereof, said control wheel defining a plurality of discrete positions defined peripherally therearound at separate pivotal positions, said control wheel including:
      (1) a cam profile edge extending circumferentially around said control wheel, said control wheel further defining a cam slot means adjacent said cam profile edge;
      (2) a wheel lug means attached with respect to said control wheel;
   (c) a rocker means pivotally movable with respect to said housing means and positioned adjacent said control wheel, said rocker means being movable between an initial flow position and a final flow position, said rocker means including;
      (1) a first arm means extending outwardly toward said control wheel;
      (2) a cam follower means attached with respect to said first arm means, said cam follower means adapted to abut said cam profile edge and said cam slot means selectively responsive to pivotal movement of said control wheel, said rocker means being responsive to said cam follower means being in abutment with respect to said cam profile edge of said control wheel to urge said rocker means to the initial flow position, said rocker means being responsive to said cam follower means being in abutment with respect to said cam slot means of said control wheel to facilitate movement of said rocker means to the final flow position;
      (3) a second arm means extending outwardly toward said control wheel, said second arm means including a lug abutment means adapted to selectively abut said wheel lug means responsive to pivotal movement of said control wheel means to urge said rocker means to the final flow position;
      (4) a first driving surface being selectively movable toward one of said tubular conduits responsive to movement of said rocker means to the initial flow position to facilitate tubular conduit restriction responsive to abutment of said cam follower means of said first arm means with respect to said cam profile edge of said control wheel;
      (5) a second driving surface being movable toward at least one other of the tubular conduits responsive to movement of said rocker means to the final flow position to facilitate tubular conduit restriction responsive to abutment of said cam follower means of said first arm means with respect to said cam slot means of said control wheel and abutment of said lug abutment means with respect to said wheel lug means;
   (d) a first plunger means movably mounted on said housing means for selective movement thereof between a steady state first opened position and a first closed position with respect to a tubular conduit, said first plunger means including:
      (1) a first drive head positioned adjacent said rocker means, said first driving surface of said rocker means being adjacent said first drive head to be selectively placed in abutment therewith for urging said first plunger means to the first closed position responsive to movement of said rocker means to the initial flow position;
      (2) a first restriction means positioned on said first plunger means adjacent selected tubular conduits to allow free fluid flow therethrough responsive to said first plunger means being in the first opened position and to restrict fluid flow therethrough responsive to said first plunger means being in the first closed position;
      (3) a first guide means for maintaining orientation of said first plunger means with respect to said housing means, said rocker means and said compressible tubular conduits;
   (e) a second plunger means movably mounted on said housing means for selective movement thereof between a steady state second opened position and a second closed position with respect to another tubular conduit, said second plunger means including:
      (1) a second drive head positioned adjacent said rocker means, said second driving surface of said rocker means being adjacent said second drive head to be selectively placed in abutment therewith for urging said second plunger means to the closed position responsive to movement of said rocker means to the final flow position;
      (2) a second restriction means positioned on said second plunger means adjacent selected tubular conduits to allow free fluid flow therethrough responsive to said second plunger means being in the second opened position and to restrict fluid flow therethrough responsive to said second plunger means being in the second closed position;

(3) a second guide means for maintaining orientation of said second plunger means with respect to said housing means, said rocker means and said compressible tubular conduits; and (f) a drive means operatively attached to said control wheel means to urge pivotal movement thereof.

2. A flow control apparatus for regulating fluid flow through at least two compressible tubular conduits being particularly usable with kidney dialysis equipment as defined in claim 1 wherein said control wheel is oriented horizontally with the central axis thereof oriented in a vertical direction to facilitate usage of said apparatus with vertically extending fluid conduits.

3. A flow control apparatus for regulating fluid flow through at least two compressible tubular conduits being particularly usable with kidney dialysis equipment as defined in claim 1 wherein said wheel lug means comprises a wheel lug roller to facilitate abutment with respect to said lug abutment means of said second arm means of said rocker means.

4. A flow control apparatus for regulating fluid flow through at least two compressible tubular conduits being particularly usable with kidney dialysis equipment as defined in claim 1 wherein said cam follower means comprises a cam follower roller to facilitate contact with said cam profile edge and said cam slot means.

5. A flow control apparatus for regulating fluid flow through at least two compressible tubular conduits being particularly usable with kidney dialysis equipment as defined in claim 1 wherein said rocker means includes a first plunger retracting surface adapted to abut said first drive head of said first plunger means responsive to movement of said rocker means to the final flow position to facilitate movement of said first plunger means to the first opened position.

6. A flow control apparatus for regulating fluid flow through at least two compressible tubular conduits being particularly usable with kidney dialysis equipment as defined in claim 1 wherein said first drive head of said first plunger means includes a first drive head roller to facilitate abutting contact between said first drive head and said first driving surface of said rocker means.

7. A flow control apparatus for regulating fluid flow through at least two compressible tubular conduits being particularly usable with kidney dialysis equipment as defined in claim 1 wherein said second drive head of said second plunger means includes a second drive head roller to facilitate abutting contact between said second drive head and said second driving surface of said rocker means.

8. A flow control apparatus for regulating fluid flow through at least two compressible tubular conduits being particularly usable with kidney dialysis equipment as defined in claim 1 wherein said first guide means includes a first groove and stud means defined between said first plunger means and said housing means to maintain orientation of said first plunger means with respect to said rocker means and the tubular conduits.

9. A flow control apparatus for regulating fluid flow through at least two compressible tubular conduits being particularly usable with kidney dialysis equipment as defined in claim 1 wherein said first plunger means further includes a first resilient return means attached with respect to said housing for maintaining said first plunger means resiliently biased into a steady state first opened position.

10. A flow control apparatus for regulating fluid flow through at least two compressible tubular conduits being particularly usable with kidney dialysis equipment as defined in claim 9 wherein said first resilient return means comprises a first return spring means.

11. A flow control apparatus for regulating fluid flow through at least two compressible tubular conduits being particularly usable with kidney dialysis equipment as defined in claim 1 wherein said second guide means includes a second groove and stud means defined between said second plunger means and said housing means to maintain orientation of said second plunger means with respect to said rocker means and the tubular conduits.

12. A flow control apparatus for regulating fluid flow through at least two compressible tubular conduits being particularly usable with kidney dialysis equipment as defined in claim 1 wherein said second plunger means further includes a second resilient return means attached with respect to said housing for maintaining said second plunger means resiliently biased into a steady state second opened position.

13. A flow control apparatus for regulating fluid flow through at least two compressible tubular conduits being particularly usable with kidney dialysis equipment as defined in claim 12 wherein said second resilient return means comprises a second return spring means.

14. A flow control apparatus for regulating fluid flow through at least two compressible tubular conduits being particularly usable with kidney dialysis equipment as defined in claim 1 wherein said wheel lug means and said cam slot means are positioned adjacent with respect to one another peripherally of said control wheel.

15. A flow control apparatus for regulating fluid flow through at least two compressible tubular conduits being particularly usable with kidney dialysis equipment as defined in claim 1 wherein said control wheel is movable to a plurality of discrete positions including at least one first bag position with said rocker means in the initial flow position and a last bag position with said rocker means in the final flow position.

16. A flow control apparatus for regulating fluid flow through at least two compressible tubular conduits being particularly usable with kidney dialysis equipment as defined in claim 15 wherein said control wheel is movable to a plurality of first bag positions.

17. A flow control apparatus for regulating fluid flow through at least two compressible tubular conduits being particularly usable with kidney dialysis equipment as defined in claim 15 wherein said control wheel includes a knob means thereon to facilitate initial placement thereof to one of the first bag positions.

18. A flow control apparatus for regulating fluid flow through at least two compressible tubular conduits being particularly usable with kidney dialysis equipment as defined in claim 16 wherein said drive means urges movement of said control wheel to each of the first bag positions and finally to the final bag position.

* * * * *